United States Patent Office.

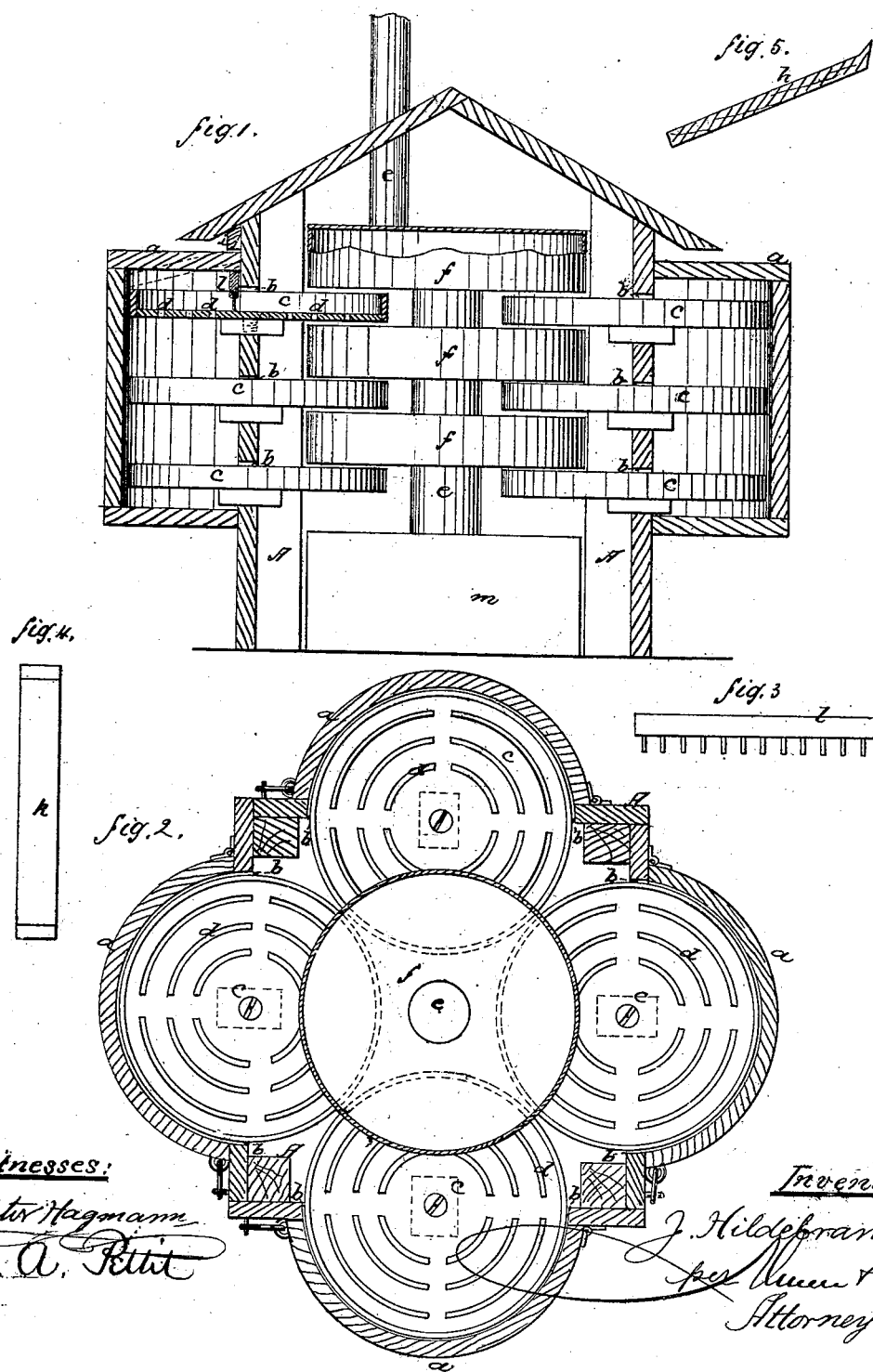
J. HILDEBRAND.
Fruit Drier.
No. 103,744.  Patented May 31, 1870.

JOHN HILDEBRAND, OF TANEYTOWN, MARYLAND, ASSIGNOR TO HIMSELF AND JACOB FRINGER, OF SAME PLACE.

Letters Patent No. 103,744, dated May 31, 1870.

FRUIT-DRIER.

The Schedule referred to in these Letters Patent and making part of the same.

*To all whom it may concern:*

Be it known that I, JOHN HILDEBRAND, of Taneytown, in the county of Carroll and State of Maryland, have invented a new and useful Improvement in Fruit-Driers; and I do hereby declare that the following is a full, clear, and exact description of the same, reference being had to the accompanying drawing forming a part of this specification, in which—

Figure 1 is a sectional elevation;
Figure 2, a horizontal section;
Figure 3, an elevation of one of the rakes;
Figure 4, an elevation of one of the plates $k$; and
Figure 5 is a sectional elevation of the shield $h$.

This invention consists mainly in the combination of pans for holding fruit, whose bottoms are perforated, with drums which communicate with the pipe by which the products of combustion are conveyed away from a furnace, when the drums are so located as to radiate heat into the pans, for the purpose of drying the fruit, the pans, drums, and furnace being inclosed within a suitable case.

In the drawing—

A is the case.

$a$ are semi-tubular doors, hinged to the sides of the case.

$b$ are openings made horizontally in the sides of the case.

$c$ are circular pans, whose bottoms are provided with perforations $d$, the pans being placed in the openings $b$, so as to be half inside the case, and half within the semi-tubular doors, when the latter are closed and pivoted at their centers so as to be easily rotated by hand, the pans, in this instance, being arranged in four vertical series, one at each side of the case.

$m$ is the furnace, located at the bottom of the case.

$e$ is the smoke-pipe.

$f$ are drums, arranged in a vertical series on the smoke-pipe, communicating therewith, and extending between the pans, as shown in fig. 1, so as to radiate heated air upward through the perforations in the bottom of the pans, and downward directly into the pans, by which process the fruit is dried.

Sufficient ventilation is secured by throwing open the doors $a$, and thus exposing the outer halves of the pans.

In rainy weather, after throwing open the doors, a semicircular shield, $h$, of sufficient dimensions to cover the exposed parts of the pans, is placed over the upper pan of each series, and held there, for the purpose of shedding rain, by a flange on the straight side of the shield, projecting into a recess in a horizontal bar, $i$, secured to the outside of the case, above the door, for this purpose.

When the open doors afford too much ventilation, plates $k$, fig. 4, are placed diametrically in the pans $c$, and attached to the sides of the case, so as to close the openings $b$, except as to those portions of said openings which are outside of the pans.

It is necessary to turn the pans, from time to time, on their pivots, in order to subject all the fruit equally to the action of the heated air.

When the plates $k$ are in place, they keep all the fruit within the case, and, as the pans are turned, cause an agitation of the fruit, which exposes all parts of each piece in turn to the heated air.

When the plates $k$ are disused, rakes $l$, fig. 3, are substituted for them.

The rakes allow the fruit to come forth from the case as the pans turn, and agitate it as the pieces pass beneath them.

Having thus described my invention,

What I claim as new, and desire to secure by Letters Patent, is—

1. The combination of the perforated pans $c$, whether arranged in vertical series or not, with the drums $f$, in the manner and for the purpose described.

2. The combination of the pans $c$ with the rakes $l$, as and for the object specified.

3. The combination of the pans $c$ with the plates $k$, as and to the end set forth.

4. The combination of the pans $c$ with the shield $h$, as and for the object explained.

To the above specification of my invention, I have signed my hand this 26th day of April, 1870.

JOHN HILDEBRAND.

Witnesses:
SOLON C. KEMON,
JACOB FRINGER.